United States Patent
Morisaki et al.

(10) Patent No.: US 6,467,952 B2
(45) Date of Patent: *Oct. 22, 2002

(54) VIRTUAL BLACKBODY RADIATION SYSTEM AND RADIATION TEMPERATURE MEASURING SYSTEM

(75) Inventors: Eisuke Morisaki, Kanagawa-ken; Masayuki Kitamura, Tokyo-to; Nobuaki Takahashi, Tokyo-to; Takashi Shigeoka, Tokyo-to, all of (JP)

(73) Assignee: Tokyo Electron Limited, Tokyo-To (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,239

(22) Filed: Mar. 16, 2000

(65) Prior Publication Data

US 2002/0106000 A1 Aug. 8, 2002

(30) Foreign Application Priority Data

Mar. 19, 1999 (JP) .......................... 11-076209

(51) Int. Cl.[7] .......................... G01K 15/00; G01J 5/08; G01D 18/00; G02B 7/04
(52) U.S. Cl. .................. 374/129; 374/2; 250/252.1; 250/201.2
(58) Field of Search .................. 374/129, 130, 374/1–2, 121, 126, 128, 131; 250/252.1, 201.2, 201.5, 238; 396/82, 97, 111

(56) References Cited

U.S. PATENT DOCUMENTS 4,466,748 A * 8/1984 Needham .................... 374/129
4,801,212 A * 1/1989 Imura ........................ 374/130

(List continued on next page.)

FOREIGN PATENT DOCUMENTS

| JP | 402128125 | * 5/1990 | ................. 250/330 |
| JP | 8-255800 | 10/1996 | |
| JP | 10-170343 | 6/1998 | |
| JP | 11-233504 | 8/1999 | |
| SU | 787910 | * 12/1980 | ................. 374/129 |

OTHER PUBLICATIONS

M.S.Scholl. Temperature calibration of an infrared radiation source. Applied Physics. vol. 19, No. 21, pp. 3622–3624, Nov. 1, 1980.*

Primary Examiner—Diego Gutierrez
Assistant Examiner—Gail Verbitsky
(74) Attorney, Agent, or Firm—Smith, Gambrell & Russell, LLP (57) ABSTRACT

A virtual blackbody radiation system (10) includes a light-emitting unit (1) including an LED driven by a fixed current, a light-receiving unit (2) including a sapphire rod, and an optical unit (3) including lenses (31, 32) for converging light emitted by the light-emitting unit in a convergent light. A cylindrical member (41) included in the optical unit (3) can be moved along the optical axis by a servomotor (42) included in a focus adjusting unit (4) for positional adjustment. The focus of convergent light relative to the light-receiving unit (2) can be adjusted by moving the lens (32) disposed in the cylindrical member (41) along the optical axis relative to the light-receiving unit (2). The intensity of the convergent light on the light-receiving unit (2) can be adjusted to the intensity of predetermined blackbody radiation. Thus, the virtual blackbody radiation system (10) is able to obtain light of a desired intensity without changing the driving current for driving a light source; consequently, the life time of the light source can be extended and the stability of radiation can be improved.

9 Claims, 5 Drawing Sheets

U.S. PATENT DOCUMENTS

| | | | | |
|---|---|---|---|---|
| 4,919,505 A | * | 4/1990 | Bartosiak et al. | 350/96.18 |
| 5,105,075 A | * | 4/1992 | Ohta et al. | 250/201.2 |
| 5,172,978 A | * | 12/1992 | Nomura et al. | 374/130 |
| 5,600,138 A | * | 2/1997 | Colson et al. | 250/330 |
| 5,640,015 A | * | 6/1997 | Kienitz et al. | 250/349 |
| 5,655,838 A | * | 8/1997 | Ridley et al. | 374/130 |
| 5,660,472 A | | 8/1997 | Peuse et al. | 374/128 |
| 5,820,261 A | * | 10/1998 | Yam | 374/2 |
| 5,836,694 A | * | 11/1998 | Nguyen | 374/130 |

* cited by examiner

VIRTUAL BLACKBODY RADIATION SYSTEM AND RADIATION TEMPERATURE MEASURING SYSTEM

BACKGROUND OF THE INVENTION

1. Field of the Invention

The present invention relates to a virtual blackbody radiation system employing a light-emitting device, such as a light-emitting diode (hereinafter abbreviated to "LED"), and a radiation temperature measuring system employing the virtual blackbody radiation system.

2. Description of the Related Art

A short-time annealing process for annealing semiconductor wafers (hereinafter referred to simply as "wafers") is one of processes for fabricating semiconductor devices. For example, a single-wafer lamp annealing device using a lamp as a heat source is used. The annealing device measures temperatures of regions in a surface of a wafer and regulates heating energy on the basis of measured temperatures to maintain a uniform temperature distribution in the surface f the wafer.

A noncontact radiation thermometer has been used for temperature measurement in recent years. The noncontact radiation thermometer is capable of avoiding metal contamination, which occurs when a thermocouple is used for measuring high temperatures exceeding 1000° C. due to metals, such as Fe, Cr and Ni, emitted by the sheath of the thermocouple, and is excellent in reactivity and accuracy. In a heat-processing environment in which the wafer is heated and cooled quickly, such as a short-time annealing process, the radiation thermometer has a tendency to drift. Therefore, the radiation thermometer needs calibration after the same has been used for a certain period of time.

Generally, a known radiation thermometer calibrating method measures the temperature of a standard blackbody furnace by a radiation thermometer, and compares a measured temperature of the standard blackbody furnace with the true temperature of the standard black furnace, and calibrates the radiation thermometer on the basis of the results of comparison. Another known radiation thermometer calibrating method uses, for calibration, virtual blackbody radiation at a predetermined temperature simulated by an LED by adjusting the intensity of light emitted by the LED instead of blackbody radiation radiated by a standard blackbody furnace.

When a standard blackbody furnace is used for calibrating a radiation thermometer, a long time in the range of 1 to two hours is necessary until the standard blackbody furnace stabilizes at a desired temperature. Therefore, more than half a day will be necessary for calibrating the radiation thermometer for five or more temperatures. The large, heavy blackbody furnace is inconvenient to use.

When virtual blackbody radiation is used, the driving current for driving the LED is regulated to make the LED emit light of a desired intensity to produce blackbody radiation corresponding to a predetermined temperature. Consequently, the LED is deteriorated rapidly and has a short life time. The radiation of the LED is unstable and the intensity of light emitted by the LED can be adjusted only in a narrow intensity range.

The present invention has been made in view of the foregoing problems and it is therefore an object of the present invention to provide a virtual blackbody radiation system capable of emitting light of a desired intensity without varying a driving current for driving a light source included therein, of extending the life time of the light source and having an improved radiation stability, and to provide a radiation thermometer employing the virtual blackbody radiation system.

SUMMARY OF THE INVENTION

With the foregoing object in view, the present invention provides a virtual blackbody radiation system including a light-emitting unit for emitting light of a fixed intensity in a direction along an optical axis; an optical unit for converging light emitted by the light-emitting unit in a convergent light; a photodetector disposed on the optical axis to receive the convergent light converged by the optical unit; and a focus adjusting unit for adjusting focus of the convergent light on the optical axis relative to the photodetector to adjust the intensity of the convergent light on the photodetector so that the intensity of the convergent light on the photodetector corresponds to that of radiation radiated by a blackbody of a predetermined temperature.

The present invention provides also a radiation temperature measuring system including a plurality of radiation thermometers; light receiving devices that receive light emitted by an object of measurement; a plurality of optical waveguides for guiding the light received by the light receiving devices to the radiation thermometers; a virtual blackbody radiation system for emitting modulated virtual blackbody radiation; and optical multiplexers for combining the light emitted by the object of measurement and guided by the optical waveguides and the virtual blackbody radiation radiated by the virtual blackbody radiation system.

DESCRIPTION OF THE PREFERRED EMBODIMENTS

Figure 1:
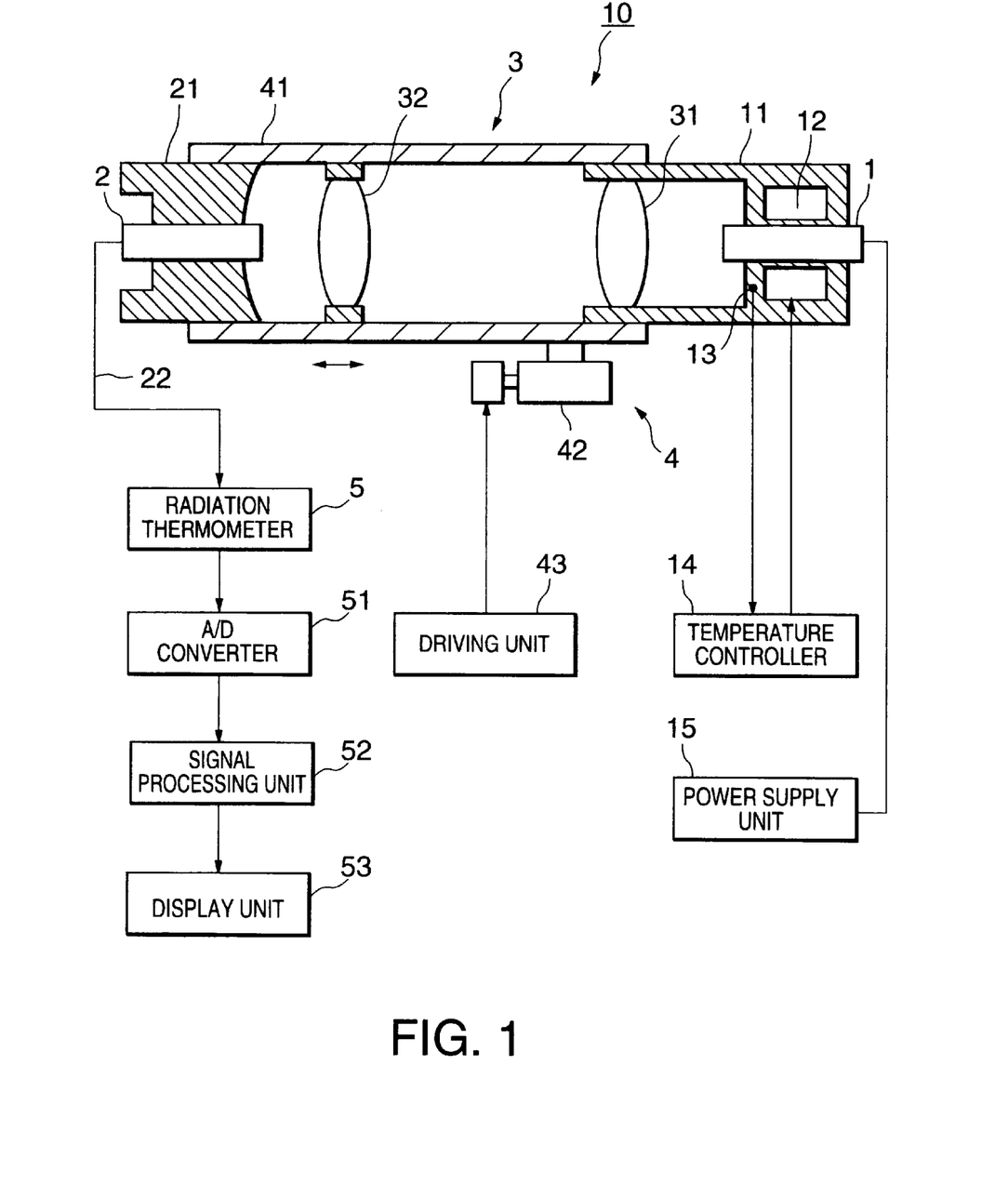
FIG. 1 is a block diagram of a virtual blackbody radiation system in a preferred embodiment of the present invention.

Preferred embodiments of the present invention will be described with reference to the accompanying drawings. Referring to FIG. 1, a virtual blackbody radiation system 10 in a preferred embodiment of the present invention includes a light-emitting unit 1 provided with, for example, a LED, a photodetector 2 including, for example, a sapphire rod and disposed with its optical axis aligned with the optical axis 1 of the virtual blackbody radiation system 10, an optical unit 3 for converging divergent light emitted from the light-emitting unit 1, and a focus adjusting system 4 for adjusting the focus at which the convergent light converged by the optical unit 3 is focused relative to the photodetector 2 on the optical axis.

The light-emitting unit 1 is connected to a power supply 16 and is held fixedly on the bottom of a holding member 11 having the shape of a bottomed cylinder. A heater 12 is embedded in the bottom wall of the holding member 11 so as to surround the light-emitting unit 1. A thermocouple 13, i.e., a temperature measuring means, is disposed near the light-emitting unit 1. The heating operation of the heater 12 is controlled by a temperature controller 14 on the basis of temperature information provided by the thermocouple 13 to maintain the light-emitting unit 1 at a predetermined temperature.

The light-emitting unit 1 is provided with a photodiode, not shown, or the like for monitoring the intensity of the light emitted by, for example, the LED. Current supplied to the light emitting unit 1 by the power supply unit 15 is controlled in a feedback control mode so that the light-emitting unit 1 emits light of a fixed intensity constantly.

The optical unit 3 has, for example, two optical lenses, i.e., a first lens 31 and a second lens 32. The first lens 31 disposed near the light-emitting unit 1 collimates the divergent light emitted by the light-emitting unit 1 to produce a collimated light beam of parallel light rays. The first lens 31 is held fixedly on the holding member 11 holding the light-emitting unit 1. The second lens 32 disposed near the photodetector 2 is a convergent lens for converging the collimated light beam. The second lens 32 is held fixedly in a cylindrical member 41. A first open end of the cylindrical member 41 is fitted on the holding member 11 for axial sliding movement on the holding member 11. The inner surface of the cylindrical member 41 is mirror-finished.

A second open end of the cylindrical member 41 is fitted on another holding member 21 holding the photodetector 2, for axial sliding movement on the holding member 21. The holding members 11 and 21 are fitted tightly in the opposite ends of the cylindrical member 41 to prevent leakage of external light into the cylindrical member 41. The respective optical axes of the first lens 31, the second lens 32, the light-emitting unit 1 and the photodetector 2 are aligned on the same optical axis of the virtual blackbody radiation system 10.

Figure 2A:
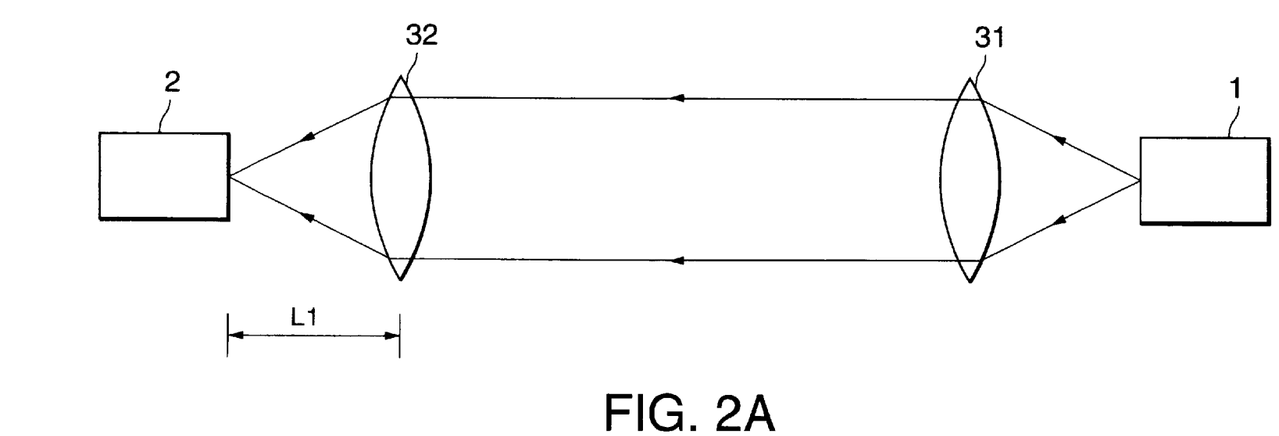
FIGS. 2A and 2B are diagrammatic views explaining the relation between a focus at which convergent light is focused in the virtual blackbody radiation system shown in FIG. 1 and light intensity.
Figure 2B:
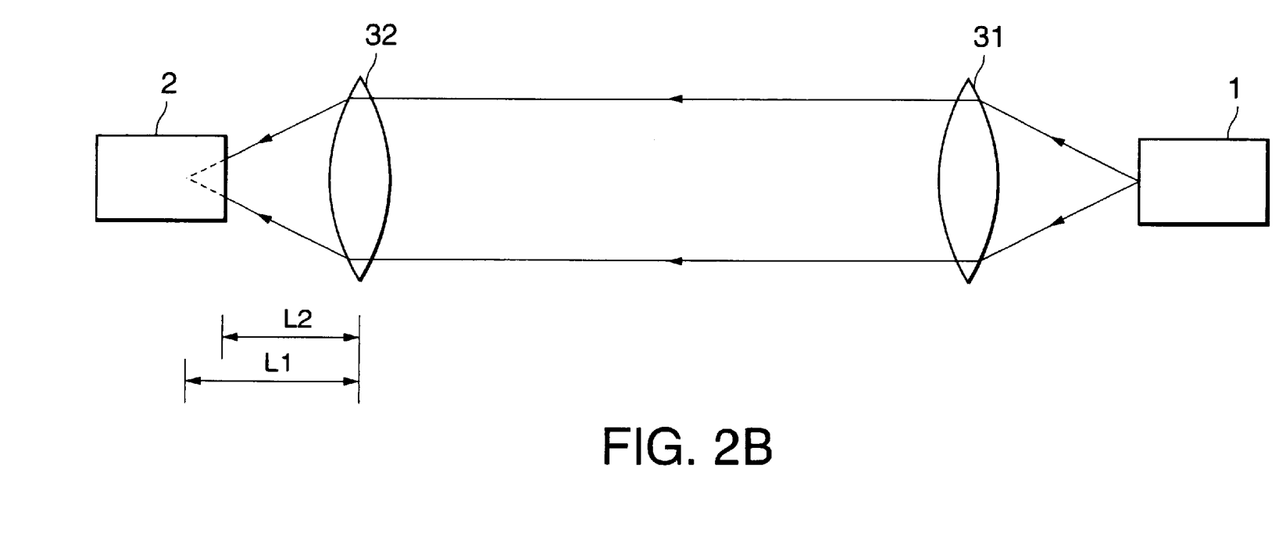

The cylindrical member 41 is moved axially along the optical axis 1 by a servomotor 42. A driving unit 43 supplies power to the servomotor 42. The displacement of the cylindrical member 41 can be adjusted by properly controlling power supply from the driving unit 43 to the servomotor 42 to change the position of the second lens 32 relative to the photodetector 2. When the position of the second lens 32 relative to the photodetector 2 is changed, the position of the focus at which the light beam is focused changes. The intensity of light on the photodetector 2 is a maximum (FIG. 2A) when the focus of the light beam is on the light receiving surface of the photodetector 2. The intensity of light of the photodetector 2 decreases as the distance of the focus of the light beam from the light receiving surface of the photodetector 2 increases (FIG. 2B). The second lens 32, the cylindrical member 41 having the mirror-finished inner surface, the servomotor 42 and the driving unit 43 constitute the focus adjusting system 4.

As shown in FIG. 1, a radiation thermometer 5 is connected to the virtual blackbody radiation system 10 to calibrate the radiation thermometer 5. The photodetector 2 is connected by an optical waveguide 22, such as an optical fiber cable, to the radiation thermometer 5. An analog signal representing current produced by the radiation thermometer 5 is converted into a corresponding digital signal by, for example, an A/D converter 51. A signal processing unit 52 processes the digital signal and a display unit 53 displays temperature information provided by the signal processing unit 52.

Figure 3:
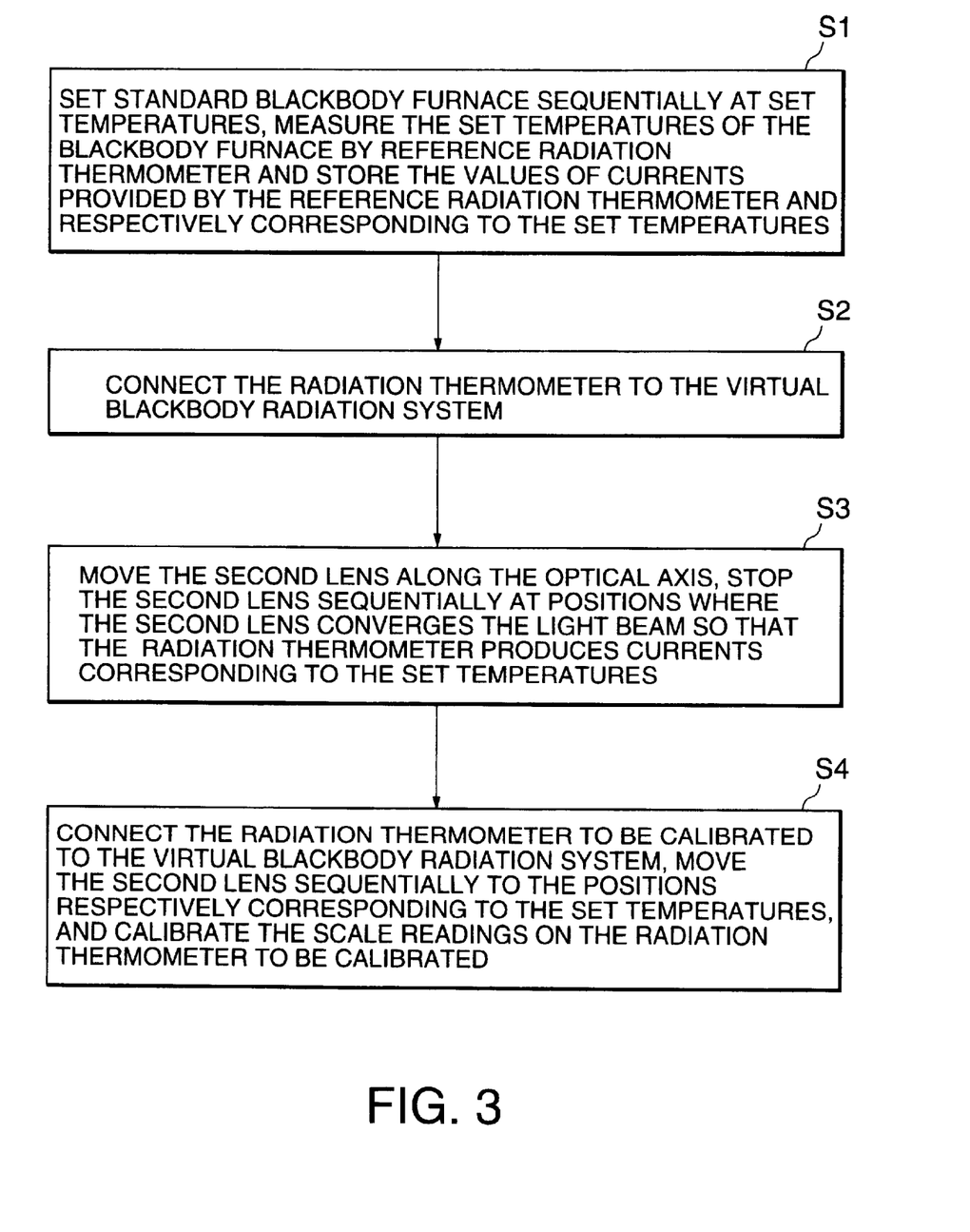
FIG. 3 is a flow chart of a procedure for calibrating a radiation thermometer by using the virtual blackbody radiation system according to the present invention.

A procedure for calibrating the radiation thermometer 5 by using the virtual blackbody radiation system 10 will be explained. Referring to FIG. 3 showing the procedure for calibrating the radiation thermometer 5 in a flow chart, a standard blackbody furnace is set sequentially at predetermined temperatures T1, T2, T3, T4 and T5 in the range of, for example, 100 to 1000° C. and the temperatures of the standard blackbody furnace are measured by a reference radiation thermometer, and currents I1, I2, I3, I4 and I5 produced by the reference radiation thermometer and respectively corresponding to the predetermined temperatures T1, T2, T3, T4 and T5 are stored in step S1.

In step S2, the radiation thermometer is connected to the virtual blackbody radiation system 10 by the optical waveguide 22, and the light-emitting unit 1 is heated and maintained at the predetermined temperature T1 by the heater 12. In this state, light of a fixed intensity is emitted by the light-emitting unit 1, the servomotor 42 is actuated to move the cylindrical member 41 so as to displace the second lens 32 along the optical axis, the second lens 32 is stopped at a position X1 where the second lens 32 converges the light beam so that the radiation thermometer produces the current I1 corresponding to the predetermined temperature T1, and data representing the position X1 is stored Similarly, the second lens 32 is stopped at positions X2, X3, X4 and X5 where the second lens 32 converges the light beam so that the radiation thermometer produces the currents I2, I3, I4 and I5 corresponding to the temperatures T2, T3, T4 and T5, and data representing the positions X2, X3, X4 and X5 are stored in step S3. The initial setting of the virtual blackbody radiation system 10 is completed by steps S1, S2 and S3.

When calibrating the radiation thermometer, the radiation thermometer is connected to the virtual blackbody radiation system 10 after initial setting, the second lens 32 is moved sequentially to the positions X1, X2, X3, X4 and X5 respectively corresponding to the temperatures T1, T2, T3, T4 and T5, and indications indicating temperatures t1, t2, t3, t4 and t5 on the radiation thermometer 5 are read when the second lens 32 is located sequentially at the positions X1, X2, X3, X4 and X5. In step S4, the scale readings on the radiation thermometer is corrected so that the differences between the temperatures T1 and t1, between T2 and t2, between T3 and t3, between T4 and t4 and between T5 and t5 are naughts.

In this embodiment, virtual blackbody radiation of an intensity corresponding to the blackbody radiation at a predetermined temperature can be obtained by adjusting the position of the second lens 32 relative to the photodetector 2 to change the focus of the blackbody radiation on the optical axis. Therefore, the driving current for driving the light source of the virtual blackbody radiation system 10 can be held constant, the lifetime of the light source can be extended and the stability of radiation can be improved.

Figure 4:
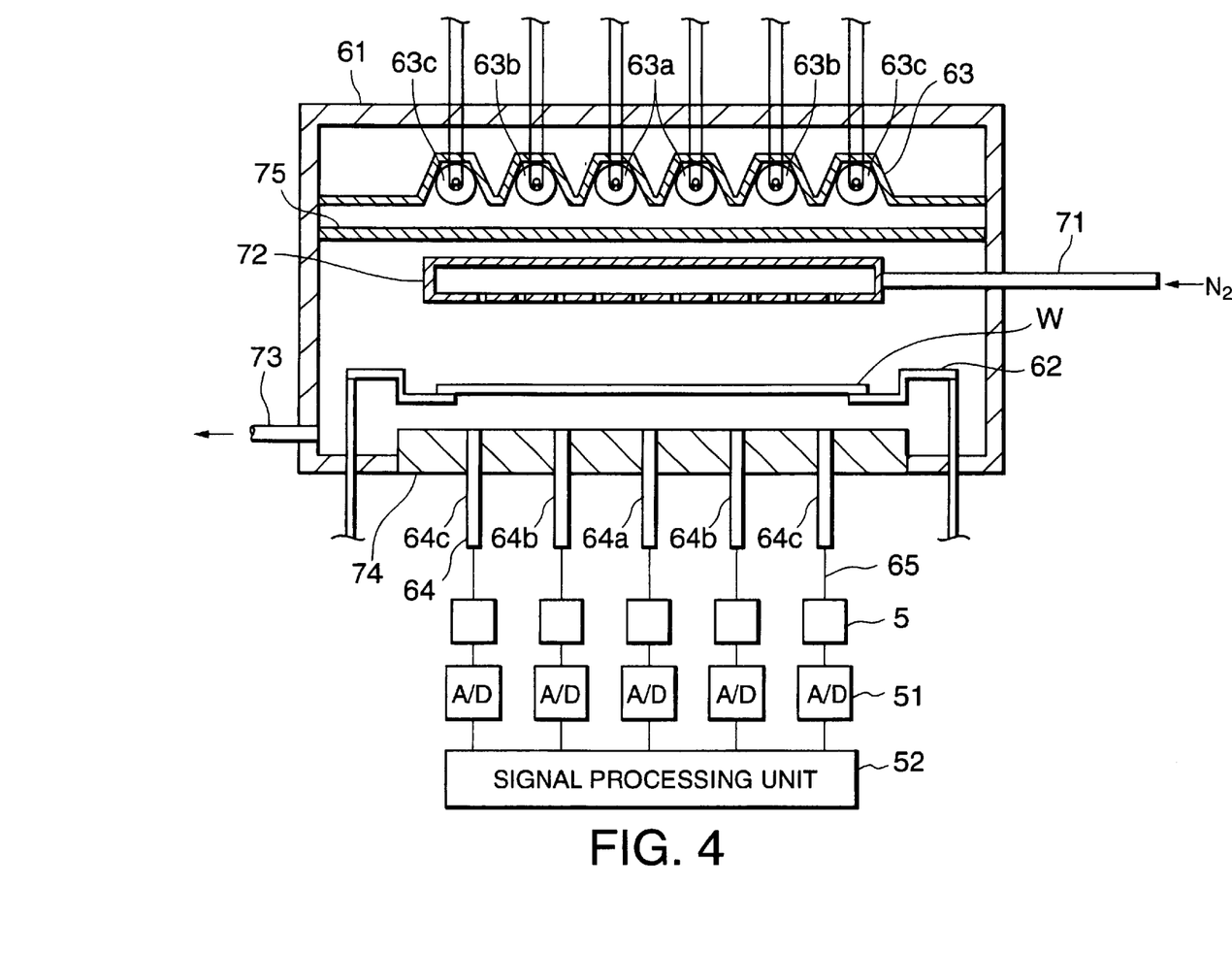
FIG. 4 is a schematic sectional view of a heat-treatment apparatus employing a radiation thermometer.

FIG. 4 shows a heat-treatment apparatus employing a radiation thermometer. This heat-treatment apparatus heats a wafer W held on a wafer holding unit 62 placed in a processing chamber defined by a processing vessel 61 by a plurality of lamps 63 serving as heating means disposed above the wafer holding unit 62 in an $N_2$ atmosphere. Optical information of the back surface of the wafer W is obtained through a plurality of sapphire rods 64 are transferred through optical fiber cables 65, i.e., optical waveguides to radiation thermometers 5. Signals provided by the radiation thermometers 5 are converted into corresponding digital signals by A/D converters 51 and the digital signals are processed by a signal processing unit 52. Shown also in FIG. 4 are a gas supply pipe 71, a gas supply device 72 generally called a shower head, a discharge pipe 73, a sapphire rod support member 74 supporting the sapphire rods 64 and a transparent plate 75 that transmits radiation heat.

The lamps 63 are arranged on three concentric circles having their centers corresponding to the center of the wafer W held in place on the wafer holding unit 62. For example, the two lamps 63a are arranged on the innermost circle, the six lamps 63b are arranged on the middle circle and the fifteen lamps 63c are arranged on the outermost circle. The sapphire rods 64 are arranged on concentric circles having their centers corresponding to the center of the wafer W held in place on the wafer holding unit 62. For example, the one sapphire rod 64a is disposed at a position corresponding to the center of the wafer W held on the wafer holding unit 62, and the sapphire rods 64b and 64c are arranged on two concentric circles having their centers corresponding to the center of the wafer W held on the wafer holding unit 62. A central part, a first annular part surrounding the central part, and a second annular part surrounding the first annular part are heated by the lamps 63a, 63b and 63c, respectively, and radiation from the central part, the first annular part and the second annular part of the wafer W is receives by the sapphire rods 64a, 64b and 64c.

When heat-treating the wafer W by this heat-treatment apparatus, the radiation thermometers 5 are calibrated by the procedure mentioned above, the wafer W is conveyed into the processing vessel 61 and is mounted on the wafer holding unit 62, and the lamps 63 are turned on to heat the wafer W at a predetermined temperature for annealing. Temperatures of the central part, the first annular part and the second annular part of the wafer W are measured by the radiation thermometers 5. The signal processing unit 52 calculates the mean of the temperatures measured by the radiation thermometers 5 corresponding to each part of the wafer W to determine the respective temperatures of the central part, the first annular part and the second annular part of the wafer W. The signal processing unit 52 compares those measured temperatures of the central part, the first annular part and the second annular part with corresponding set temperatures for the central part, the first annular part and the second annular part, and controls the amounts of heat energy generated by the lamps 63 respectively for heating the central part, the first annular part and the second annular part on the basis of the result of comparison to control the temperature of the wafer W.

Figure 5:
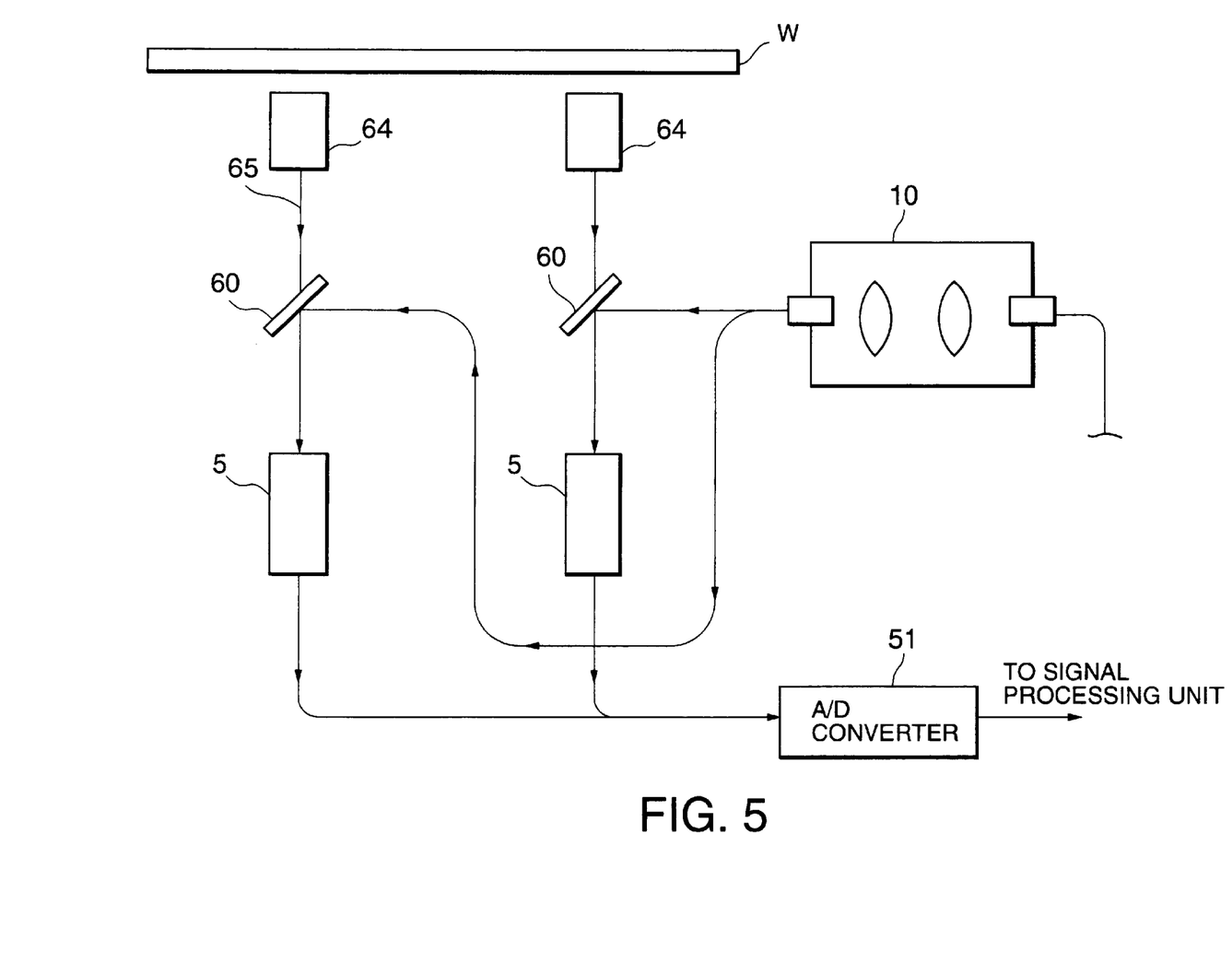
FIG. 5 is a block diagram of a radiation temperature measuring system according to the present invention.

FIG. 5 shows a radiation temperature measuring system employing a virtual blackbody radiation device by way of example. This radiation temperature measuring system combines radiation from the back surface of a wafer W received through a plurality of sapphire rods 64 with light emitted by a virtual black body radiation system 10 and receives combined light thus produced by radiation thermometers 5. Means for combining radiation are, for example, semitransparent mirrors 60. The semitransparent mirrors 60 are placed in a plurality of optical paths 65 connecting the sapphire rods 64 to the radiation thermometers 5, respectively. An optical coupler or a switcher, not shown, is used as means for distributing the radiation radiated by the virtual blackbody radiation system 10 to the plurality of optical paths 65.

In this embodiment, the virtual blackbody radiation system 10 radiates modulated light by turning on and off, for example, an LED. The modulated light is transmitted through the radiation thermometers 5 and an A/D converter 51 to a signal processing unit, and the signal processing unit processes the modulated light to distinguish the modulated light from the radiation from the back surface of the wafer.

Even if errors in measured temperatures measured by the plurality of radiation thermometers 5 are different from each other due to the drift of the radiation thermometers, the errors in the measured temperatures measured by the radiation thermometers 5 can be corrected by using the measured temperatures measured by the radiation thermometers 5 as reference values relative to the radiation radiated by the virtual blackbody radiation system 10. Absolute value of temperature for compensating an inter-device error can be obtained by measuring the temperature of the radiation radiated by the virtual blackbody radiation system 10.

The radiation temperature measuring system shown in FIG. 5 may be combined with the heat-treatment apparatus shown in FIG. 4, the wafer W may be heat-treated by controlling the amounts of heat energy generated by the lamps 63 as mentioned above, and errors in measured temperatures measured by the radiation thermometers 5 may be determined by using the virtual blackbody radiation system 10 to correct the measured temperatures. Thus, the measured temperatures are corrected and the temperature of the wafer W is controlled on the basis of corrected temperatures.

According to the present invention, the optical unit 3 may comprise a single lens and the position of the single lens may be changed. The optical system 3 may be fixed and the photodetector 2 may be moved along the optical axis relative to the optical unit 3. The virtual blackbody radiation system 10 need not be limited to that employed in the embodiment shown in FIG. 5; a virtual blackbody radiation system provided with an LED and capable of producing light of a desired intensity by adjusting the driving current for driving the LED. Optical couplers may be used instead of the semitransparent mirrors 60.

As apparent from the foregoing description, according to the present invention, light of a desired intensity can be produced without changing driving current for driving the light source of the virtual blackbody radiation system and hence the life of the light source can be extended and the stability of radiation can be improved. It is possible to compensate errors between the radiation thermometers of the radiation temperature measuring system provided with the plurality of radiation thermometers.

What is claimed is:

1. A radiation temperature-measuring system, comprising:
   a plurality of radiation thermometers;
   light-receiving devices that receive light emitted by an object of measurement;
   a plurality of optical waveguides that guide the emitted light received by the light-receiving devices to the radiation thermometers;
   an adjustable virtual blackbody radiation system that emits modulated virtual blackbody radiation into a part of each of the optical waveguides; and
   a light-combining device provided in the part of each of the optical waveguides that combines the virtual blackbody radiation radiated by the virtual blackbody radiation system with the light emitted by the object of measurement and guided by each of the optical waveguides.

2. The radiation temperature-measuring system according to claim 1, wherein the virtual blackbody radiation system comprises:
   a light-emitting unit that emits light of a fixed intensity in a direction along an optical axis;
   an optical unit that converges light emitted by the light-emitting unit into convergent light;

a photodetector disposed on the optical axis that receives the convergent light converged by the optical unit; and a focus-adjusting unit that adjusts a focus of the convergent light on the optical axis relative to the photodetector to adjust the intensity of the convergent light on the photodetector so that the intensity of the convergent light on the photodetector corresponds to that of radiation radiated by a blackbody of a predetermined temperature.

3. The radiation temperature-measuring system according to claim 1, wherein the light-combining device is a semi-transparent mirror.

4. A virtual blackbody radiation system, comprising:

a light-emitting unit that emits light of a fixed intensity in a direction along an optical axis;

a light-emitting unit holding member that holds the light emitting unit therein;

a hollow member fitted on the light-emitting unit holding member, the hollow member being capable of sliding movement with respect to the light-emitting unit holding member while preventing leakage of external light into the hollow member;

an optical unit that converges light emitted by the light-emitting unit into convergent light;

a photodetector disposed on the optical axis to receive the convergent light converged by the optical unit; and a focus-adjusting unit that adjusts a focus of the convergent light on the optical axis relative to the photodetector to adjust the intensity of the convergent light on the photodetector so that the intensity of the convergent light on the photodetector corresponds to that of radiation radiated by a blackbody of a predetermined temperature.

5. The virtual black body radiation system according to claim 4, wherein the focus-adjusting unit has a driving device that moves the hollow member along the optical axis.

6. The virtual blackbody radiation system according to claim 4, wherein the light-emitting unit holding member and the hollow member are cylindrical.

7. A virtual blackbody radiation system, comprising:

a light-emitting unit that emits light of a fixed intensity in a direction along an optical axis;

a light-emitting unit holding member that holds the light emitting-unit therein;

a hollow member, fitted on the light-emitting unit holding member, the hollow member beign capable of sliding movement with respect to the light-emitting unit holding member while preventing leakage of external light into the hollow member;

an optical unit that converges the light emitted by the light-emitting unit into convergent light, the optical unit including a convergent lens held in the hollow member;

a first lens provided in the light-emitting unit holding member;

a photodetector disposed on the optical axis to receive the convergent light converged by the optical unit; and a focus-adjusting unit that adjusts a focus of the convergent light on the optical axis relative to the photodetector to adjust the intensity of the convergent light on the photodetector so that the intensity of the convergent light on the photodetector corresponds to that of radiation radiated by the blackbody of a predetermined temperature.

8. The virtual blackbody radiation system according to claim 7, wherein the focus-adjusting unit has a driving device that moves the hollow member along the optical axis.

9. The virtual blackbody radiation system according to claim 7, wherein the light-emitting unit holding member and the hollow member are cylindrical.

* * * * *